(12) United States Patent
Levesque et al.

(10) Patent No.: US 7,928,712 B1
(45) Date of Patent: Apr. 19, 2011

(54) LOW NOISE FAST DITHERING SWITCHING POWER SUPPLY

(75) Inventors: Chris Levesque, Fountain Valley, CA (US); Joseph H. Colles, Bonsall, CA (US); Jean-Christophe Berchtold, Carlsbad, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 298 days.

(21) Appl. No.: 11/756,909

(22) Filed: Jun. 1, 2007

(51) Int. Cl.
  *G05F 1/56* (2006.01)
  *G05F 1/575* (2006.01)
(52) U.S. Cl. ......... 323/282; 323/222; 323/283; 323/288
(58) Field of Classification Search .................. 323/222, 323/282–290
  See application file for complete search history.

(56) References Cited

U.S. PATENT DOCUMENTS

| | | | |
|---|---|---|---|
| 6,229,366 B1 * | 5/2001 | Balakirshnan et al. | 327/172 |
| 6,969,978 B2 * | 11/2005 | Dening | 323/282 |
| 7,058,374 B2 | 6/2006 | Levesque et al. | |
| 2006/0017426 A1 * | 1/2006 | Yang et al. | 323/283 |

OTHER PUBLICATIONS

"DC-to-DC Converter Combats EMI," May 28, 2002, Application Note 1077, http://www.maxim-ic.com/an1077, Maxim Integrated Products.

* cited by examiner

*Primary Examiner* — Jeffrey L Sterrett
*Assistant Examiner* — Fred E Finch, III
(74) *Attorney, Agent, or Firm* — Withrow & Terranova, P.L.L.C.

(57) ABSTRACT

The present invention is a switching power supply that switches (dithers) between at least two switching frequencies without introducing a ripple signal at the dithering frequency, which is based on the time duration of a dithering cycle. In one embodiment of the present invention, an average current in an energy transfer element, such as an inductive element, during operation using one switching frequency is regulated to be approximately equal to the average current during operation using any other switching frequency. The average current may be regulated by controlling the durations of transition periods between operating using one switching frequency and operating using another switching frequency. By maintaining a constant average current while operating using different switching frequencies, dithering frequency ripple may be significantly reduced or eliminated.

24 Claims, 12 Drawing Sheets

LOW NOISE FAST DITHERING SWITCHING POWER SUPPLY

FIELD OF THE INVENTION

The present invention relates to switching power supplies, which may be used in radio frequency (RF) communications circuits.

BACKGROUND OF THE INVENTION

With the growth of the wireless communications industry, wireless communications protocols become more sophisticated and demanding in their requirements for complex modulation schemes and narrow channel bandwidths. Transmitter output spectrum requirements become more restrictive and less tolerant of spurious transmissions. Third-generation (3G) and later mobile phone standards may be particularly restrictive.

Switching power supplies are sometimes used to provide power to RF power amplifiers (PAs), since the efficiencies of switching power supplies can be fairly high. Additionally, the magnitudes of switching power supply outputs can be varied to maintain high efficiencies at different output power levels, or to amplitude modulate PAs. However, one drawback to using a switching power supply to power a PA is that a switching power supply uses switching signals at a switching frequency and may generate a ripple signal at the switching frequency and at harmonics of the switching frequency. The ripple signal may be coupled into the PA and appear at the PA's RF output, and may violate output spectrum requirements. Frequency dithering the switching frequency is a technique that is used to spread the frequency content of the ripple signal to meet output spectrum requirements; however, frequency dithering involves changing the switching frequency by using a lower dithering frequency, which may introduce its own dithering frequency ripple signal. Thus, there is a need to reduce the impact of switching power supply ripple on the output spectrum of a PA by dithering the switching frequency of the switching power supply without introducing dithering frequency ripple.

SUMMARY OF THE INVENTION

The present invention is a switching power supply that switches (dithers) between at least two switching frequencies without introducing a ripple signal at the dithering frequency, which is based on the time duration of a dithering cycle. In one embodiment of the present invention, an average current in an energy transfer element, such as an inductive element, during operation using one switching frequency is regulated to be approximately equal to the average current during operation using any other switching frequency. The average current may be regulated by controlling the durations of transition periods between operating using one switching frequency and operating using another switching frequency. By maintaining a constant average current while operating using different switching frequencies, dithering frequency ripple may be significantly reduced or eliminated. The switching power supply may provide power to an RF power amplifier (PA), other circuitry, or both.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
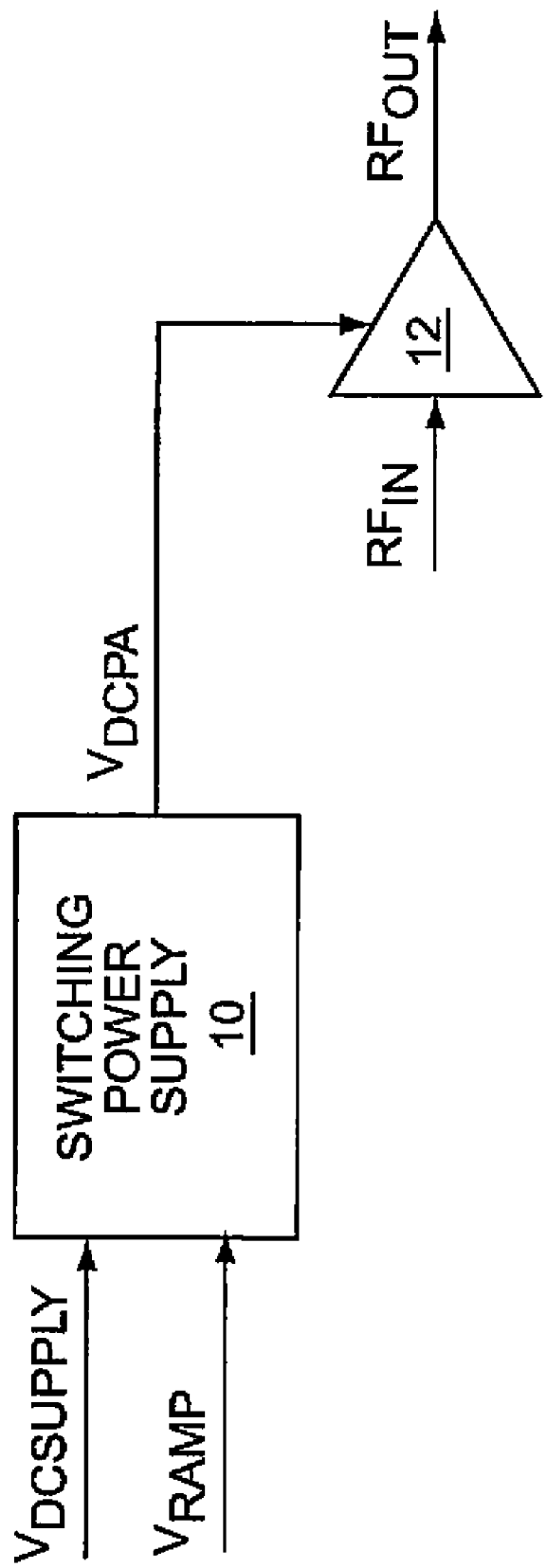
FIG. 1 shows a switching power supply feeding an RF power amplifier (PA), according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a switching power supply that switches (dithers) between at least two switching frequencies without introducing a ripple signal at the dithering frequency, which is based on the time duration of a dithering cycle. In one embodiment of the present invention, an average current in an energy transfer element, such as an inductive element, during operation using one switching frequency is regulated to be approximately equal to the average current during operation using any other switching frequency. The average current may be regulated by controlling the durations of transition periods between operating using one switching frequency and operating using another switching frequency. By maintaining a constant average current while operating using different switching frequencies, dithering frequency ripple may be significantly reduced or eliminated. The switching power supply may provide power to an RF power amplifier (PA), other circuitry, or both. The dithering frequency is the reciprocal of the dithering period, which is the time duration required to cycle through all of the switching frequencies in the dithering cycle, which is continuously repeated.

The switching power supply may use an inductive element coupled between its supply input and output to transfer energy from its input to an energy storage element, such as a capacitive element, which is coupled to the output. A timing signal at the switching frequency may be used to provide a switching signal at the switching frequency, which may control the energy transfer. The switching signal may be provided by an output of a comparator that is fed with a threshold signal and the timing signal. The switching power supply may regulate its output voltage by varying the threshold signal, which varies the duty-cycle of the switching signal.

The timing signal may have an approximate sawtooth shape, an approximate triangle shape, a shape including straight lines, a shape including curves, or any combination thereof. The switching frequency of the timing signal may be varied by changing the slope of any or all straight line elements, by changing the slope of any or all curved elements, by changing the amplitude of the timing signal, or any combination thereof. The timing signal may be provided by at least one current source coupled to a capacitive element. The switching frequency of the timing signal may be varied by changing at least one current setpoint of the at least one current source, by changing the amplitude of the voltage across the capacitive element, or both. The at least one current setpoint may be controlled by at least one digital-to-analog converter (DAC). The timing signal may feed at least one comparator, which may control the current source. One comparator may have a positive peak threshold, and another comparator may have a negative peak threshold. The switching frequency of the timing signal may be varied by changing any threshold inputs to any comparators. Any feedback circuitry between the timing signal output and the generation of the timing signal may have propagation delays or other delays, which may introduce error in the frequency of the timing signal. Such error may be compensated by changing at least one comparator input threshold, by changing at least one current setpoint, or both.

The dithering may include any number of different switching frequencies ranging from two to infinitely variable. A dithering method may include frequency selection, frequency order, and duration of each frequency. Frequency selection may be based on a pseudo-random distribution, a triangular-shaped distribution, a sawtooth-shaped distribution, or a distribution of any shape. The switching signal, timing signal, and any other switching power supply signals or functionalities, including dithering, may be provided by analog circuitry, digital circuitry, computer circuitry executing computer instructions, or any combination thereof. The switching power supply may be a buck converter, which converts an input voltage to a lower output voltage, a boost converter, which converts an input voltage to a higher output voltage, or a combination of both, in which the output voltage may be higher than, equal to, or lower than the input voltage.

FIG. 1 shows a switching power supply 10 feeding an RF PA 12, according to one embodiment of the present invention. The switching power supply 10 receives a DC supply signal $V_{DCSUPPLY}$ and a setpoint signal $V_{RAMP}$, and provides a DC PA signal $V_{DCPA}$ to a power supply input to the RF PA 12. The switching power supply 10 regulates the DC PA signal $V_{DCPA}$ based on the setpoint signal $V_{RAMP}$. The RF PA 12 receives and amplifies an RF input signal $RF_{IN}$ to provide an RF output signal $RF_{OUT}$ using the DC PA signal $V_{DCPA}$.

Figure 2:
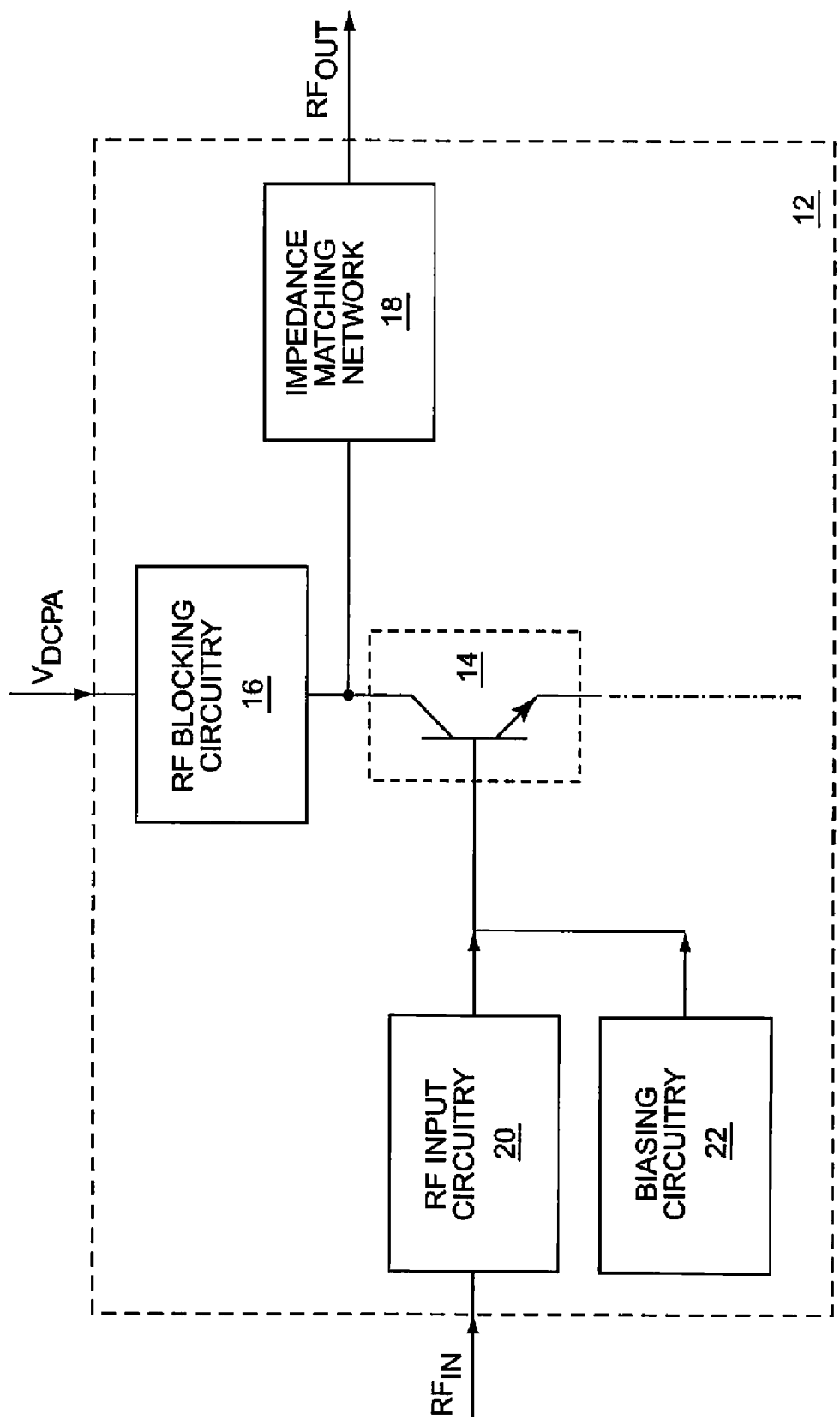
FIG. 2 shows details of the RF PA illustrated in FIG. 1.

FIG. 2 shows details of the RF PA 12 illustrated in FIG. 1. A transistor element 14 is shown as a bipolar device, and amplifies the RF input signal $RF_{IN}$ to provide the RF output signal $RF_{OUT}$. RF blocking circuitry 16 is coupled between a collector of the transistor element 14 and the switching power supply 10 to provide the DC PA signal $V_{DCPA}$ to the collector and to block RF signals at the collector from the switching power supply 10. The collector feeds the amplified RF input signal through an impedance matching network 18 to provide the RF output signal $RF_{OUT}$. The impedance matching network 18 may match the impedance of downstream RF circuitry to the output impedance at the collector. The RF input signal $RF_{IN}$ is fed to a base of the transistor element 14 through RF input circuitry 20. Biasing circuitry 22 provides the appropriate bias to the transistor element 14 for proper operation and is coupled to the base of the transistor element 14.

Figure 3:
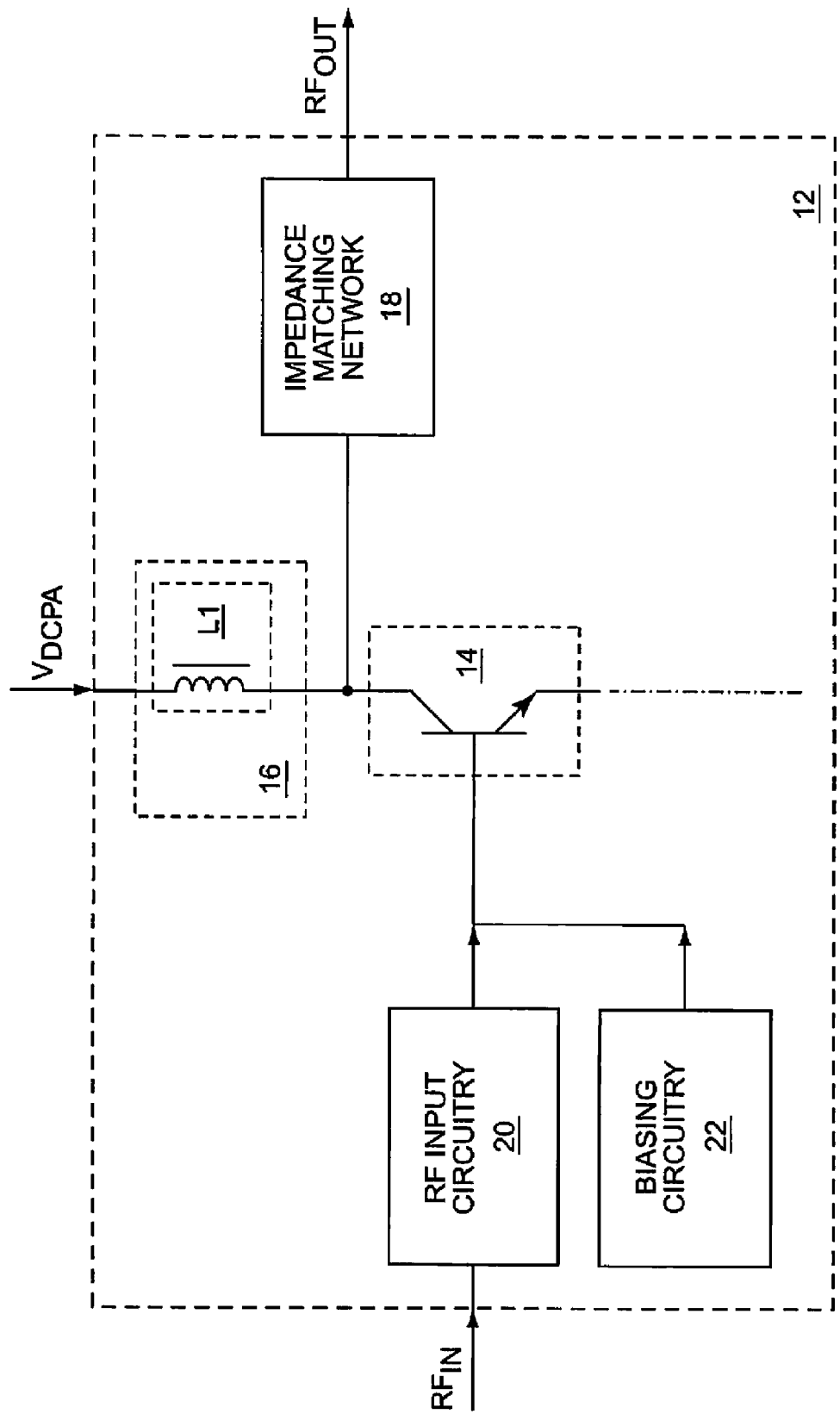
FIG. 3 shows details of the RF blocking circuitry illustrated in FIG. 2.
Figure 4:
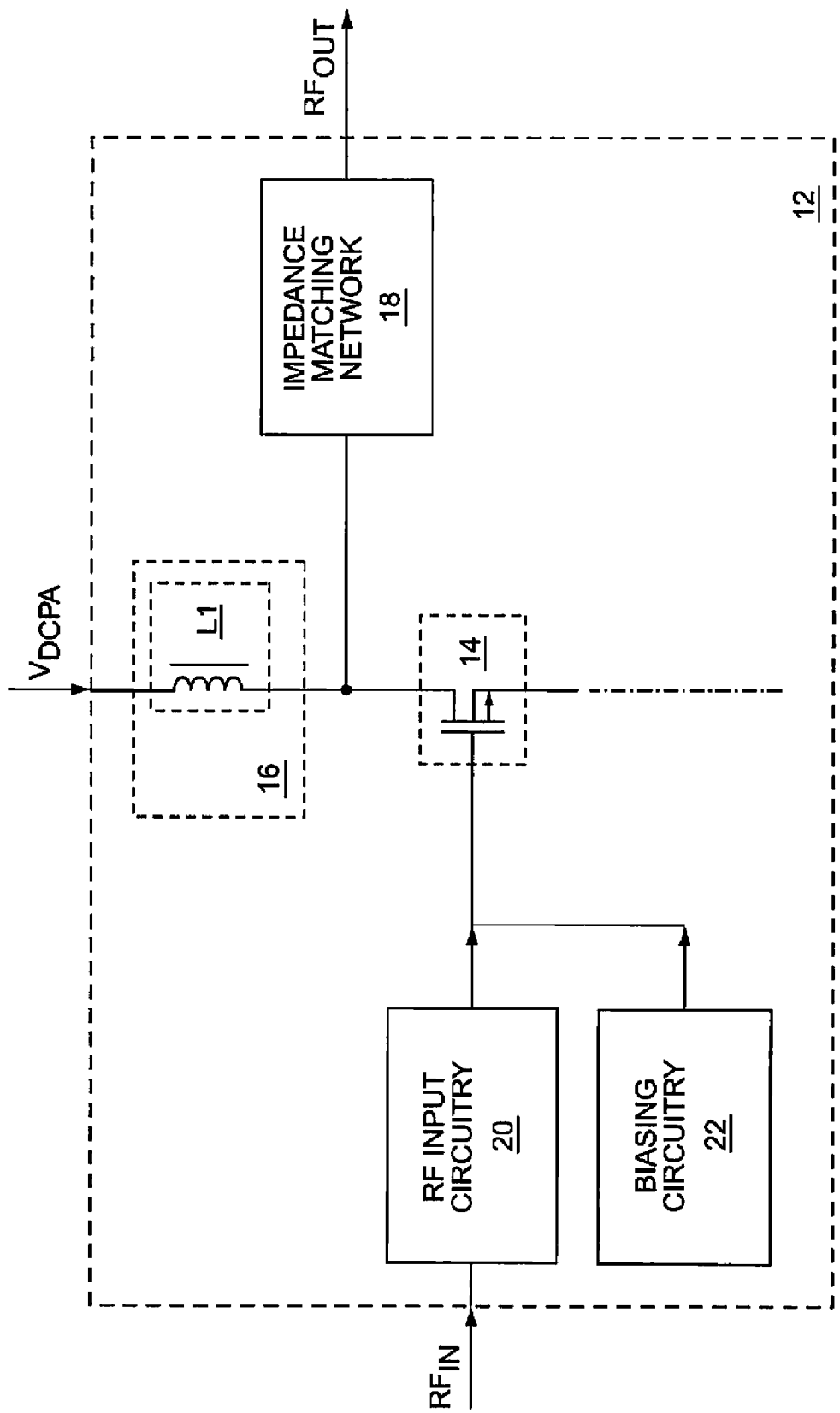
FIG. 4 shows the transistor element of the RF PA as a metal oxide semiconductor (MOS) device.

FIG. 3 shows details of the RF blocking circuitry 16 illustrated in FIG. 2. The RF blocking circuitry 16 may include a first inductive element L1. FIG. 4 shows the transistor element 14 of the RF PA 12 as a metal oxide semiconductor (MOS) device instead of a bipolar device. A gate of the MOS device may replace the base of the bipolar device and a drain of the MOS device may replace the collector of the bipolar device.

Figure 5:
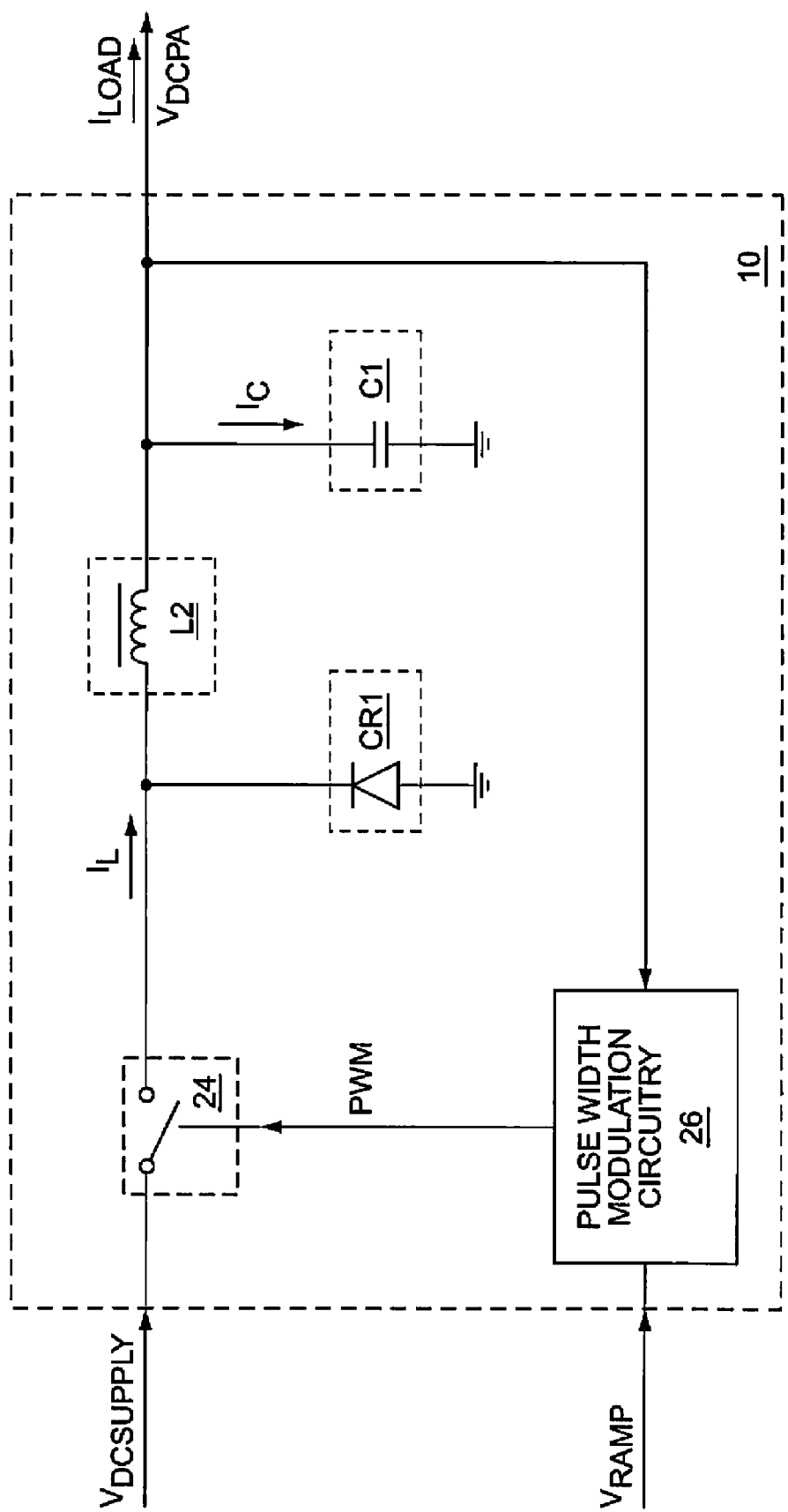
FIG. 5 shows details of the switching power supply illustrated in FIG. 1.

FIG. 5 shows details of the switching power supply 10 illustrated in FIG. 1 arranged in a buck configuration. A buck converter is used when an output voltage from the switching power supply 10 is less than an input voltage to the switching power supply 10. One switched terminal of a switching element 24 is coupled to a second inductive element L2. The other switched terminal of the switching element 24 receives the DC supply signal $V_{DCSUPPLY}$. A cathode of a diode element CR1 is coupled to the switching element 24 and the second inductive element L2. The other end of the second inductive element L2 is coupled to a capacitive element C1 and provides the DC PA signal $V_{DCPA}$. An anode of the diode element CR1 and the capacitive element C1 are coupled to GROUND. Pulse width modulation (PWM) circuitry 26 provides a PWM signal PWM to the switching element 24. The PWM circuitry 26 receives and regulates the DC PA signal $V_{DCPA}$ by varying the duty-cycle of the PWM signal PWM. A setpoint of the DC PA signal $V_{DCPA}$ is established by the PWM circuitry 26 based on the setpoint signal $V_{RAMP}$. The second inductive element L2 has an inductor current $I_L$, which supplies a capacitor current $I_c$ to the capacitive element C1 and a load current $I_{LOAD}$ to the RF PA 12.

The PWM signal PWM is a square-wave signal having a magnitude of either "1" or "0." When the PWM signal PWM is a "1," then the switching element 24 is closed, which connects the DC supply signal $V_{DCSUPPLY}$ to the cathode of the diode element CR1 and the second inductive element L2. In this embodiment of the present invention, the switching power supply 10 is a buck converter; therefore, the voltage of the DC PA signal $V_{DCPA}$ is less than the voltage of the DC supply signal $V_{DCSUPPLY}$, which causes the inductor current $I_L$ to increase. When the PWM signal PWM is a "0," then the switching element 24 is open, which disconnects the DC supply signal $V_{DCSUPPLY}$ from the cathode of the diode element CR1 and the second inductive element L2. The inductor current $I_L$ forward biases the diode element CR1; therefore, the voltage across the second inductive element L2 will be equal to a diode drop plus the voltage of the DC PA signal $V_{DCPA}$ with a polarity that is opposite to the polarity when the switching element 24 is closed, which causes the inductor current $I_L$ to decrease. By varying the duty-cycle of the PWM signal PWM, the portion of a switching cycle in which the inductor current $I_L$ is increasing versus decreasing can be varied, thereby regulating the voltage of the DC PA signal $V_{DCPA}$.

In an alternate embodiment of the present invention, the diode element CR1 may be replaced with a complementary switching element (not shown), which is normally closed when the switching element 24 is open, and vice versa. A switching power supply using such a dual switch arrangement is called a synchronous switching power supply. The complementary switching element may be driven by an inverse of the PWM signal PWM. Additional circuitry may be added to prevent both switches from being closed simultaneously or open simultaneously for very long. Other embodiments of the present invention may use a boost converter, or a combination of a buck converter and a boost converter. The PWM signal PWM may have an active supply state, in which energy is allowed to be transferred from the DC supply signal $V_{DCSUPPLY}$ to the second inductive element L2, and an inactive supply state in which energy is not allowed to be transferred from the DC supply signal $V_{DCSUPPLY}$ to the second inductive element L2. In a boost configuration (not shown), the PWM signal PWM may have an active load state, in which energy is allowed to be transferred from an energy transfer element to a load, and an inactive load state, in which energy is not allowed to be transferred from an energy transfer element to a load. Alternate embodiments of the present invention may use any combination of supply states and load states.

Figure 6A:
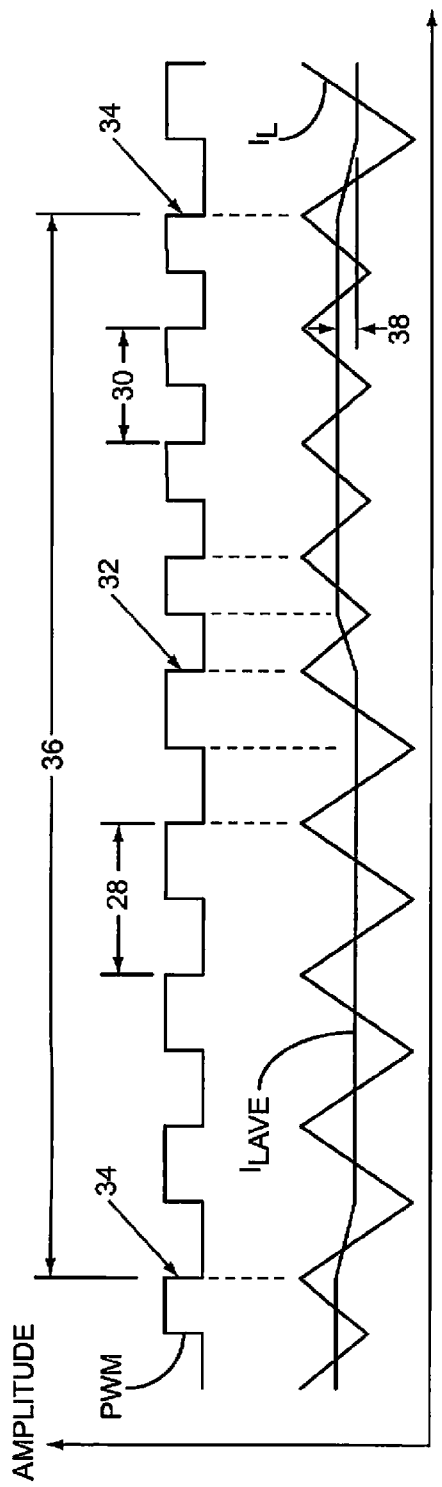
FIG. 6A is a graph showing the relationships between the pulse width modulation (PWM) signal, the inductor current, and the average inductor current illustrated in FIG. 5, according to the prior art.

FIG. 6A is a graph showing the relationships between PWM signal PWM, the inductor current $I_L$, and an average of the inductor current $I_L$ illustrated in FIG. 5, according to the prior art. The PWM signal PWM dithers (switches) between two switching frequencies, namely a slow switching frequency having a slow switching period 28 and a fast switching frequency having a fast switching period 30. The PWM signal PWM transitions from the slow switching frequency to the fast switching frequency at a slow-to-fast transition 32. and switches from the fast switching frequency to the slow switching frequency at a fast-to-slow transition 34. When the PWM signal PWM is a "1," then the inductor current $I_L$ increases, and when the PWM signal PWM is a "0," the inductor current $I_L$ decreases. An average inductor current $I_{LAVE}$ may be determined by averaging the inductor current $I_L$ on a cycle-by-cycle basis. The average inductor current $I_{LAVE}$ is lower at the slow switching frequency than at the fast switching frequency, which causes a dithering current ripple 38. A dithering period 36 is the duration of one complete dithering cycle, which is the reciprocal of the dithering frequency. For example, the dithering period 36 may be the time duration from a fast-to-slow transition 34 to a slow-to-fast transition 32 to a subsequent fast-to-slow transition 34. The frequency of the dithering current ripple 38 is equal to the dithering frequency.

Figure 6B:
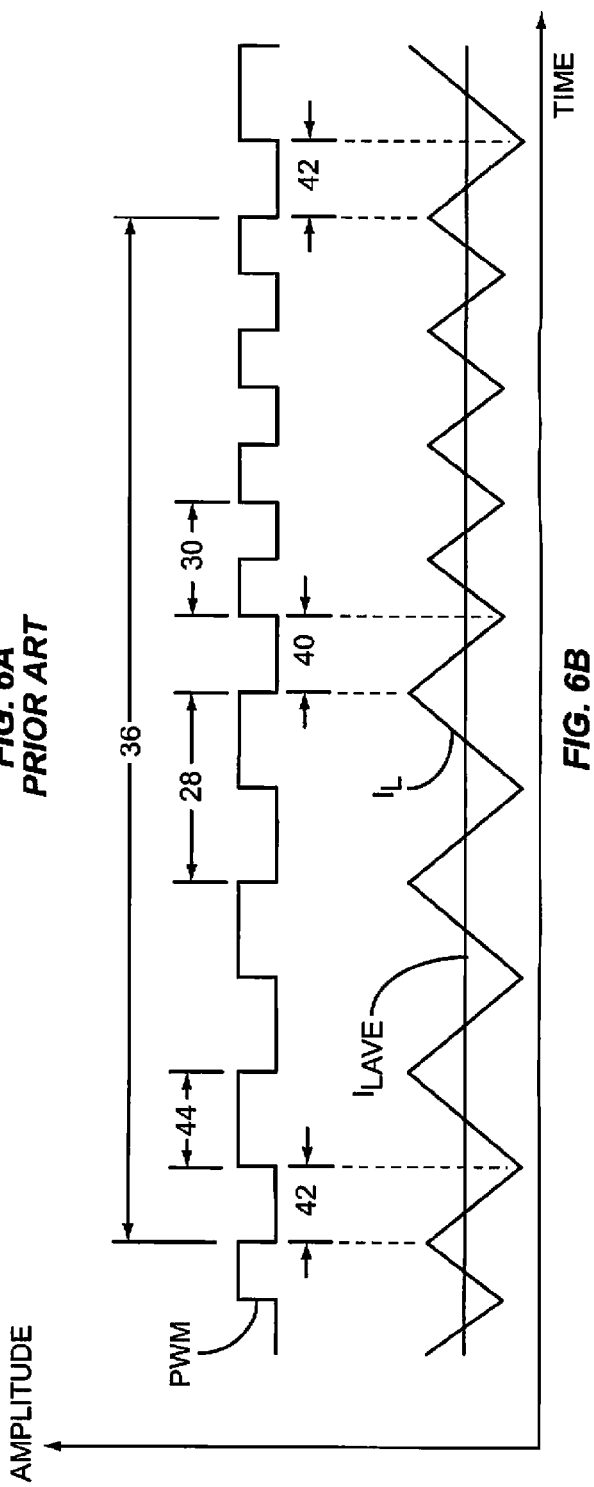
FIG. 6B is a graph showing the relationships between the PWM signal, the inductor current, and the average inductor current illustrated in FIG. 5, according to the present invention.

FIG. 6B is a graph showing the relationships between the PWM signal PWM, the inductor current $I_L$, and the average inductor current $I_{LAVE}$, according to the present invention. The dithering current ripple 38 is eliminated by adding a first transition period 40 when transitioning from the slow switching frequency to the fast switching frequency, and a second transition period 42 when transitioning from the fast switching frequency to the slow switching frequency. The first and second transition periods 40, 42 compensate the inductor current $I_L$ such that the average inductor current $I_{LAVE}$ remains constant through the dithering period 36. Since the switching element 24 is closed when the PWM signal PWM is a "1," the PWM signal PWM provides active high pulses 44. The first transition period 40 may be approximately equal to the second transition period 42. The present invention may be used with a PWM signal PWM having active high pulses 44, active low pulses (not shown), frequency transitioning from an active pulse to an active pulse, frequency transitioning from an active pulse to an inactive pulse, frequency transitioning from an inactive pulse to an active pulse, frequency transitioning from an inactive pulse to an inactive pulse, or any combination thereof. An equation is shown below for calculating the transition period when dithering between two frequencies, and all frequency transitions are either active pulse to active pulse transitions or inactive pulse to inactive pulse transitions.

$$T_{TRANS}=(T_{F1}+T_{F2})(1-D)/2,$$

where $T_{TRANS}$ is the transition period, $T_{F1}$ is the period of the first switching frequency, $T_{F2}$ is the period of the second switching frequency, and D is the duty-cycle of the PWM signal PWM. In an alternate embodiment of the present invention, the first transition period 40, the second transition period 42, or both may immediately precede or follow any combination of supply states and load states. EQ. 1 indicates the transition periods needed to maintain a constant average inductor current $I_{LAVE}$; however, other embodiments of the present invention may focus on maintaining a constant output ripple voltage, or some other criteria, either of which may require different transition periods from those presented in EQ. 1.

Figure 7:
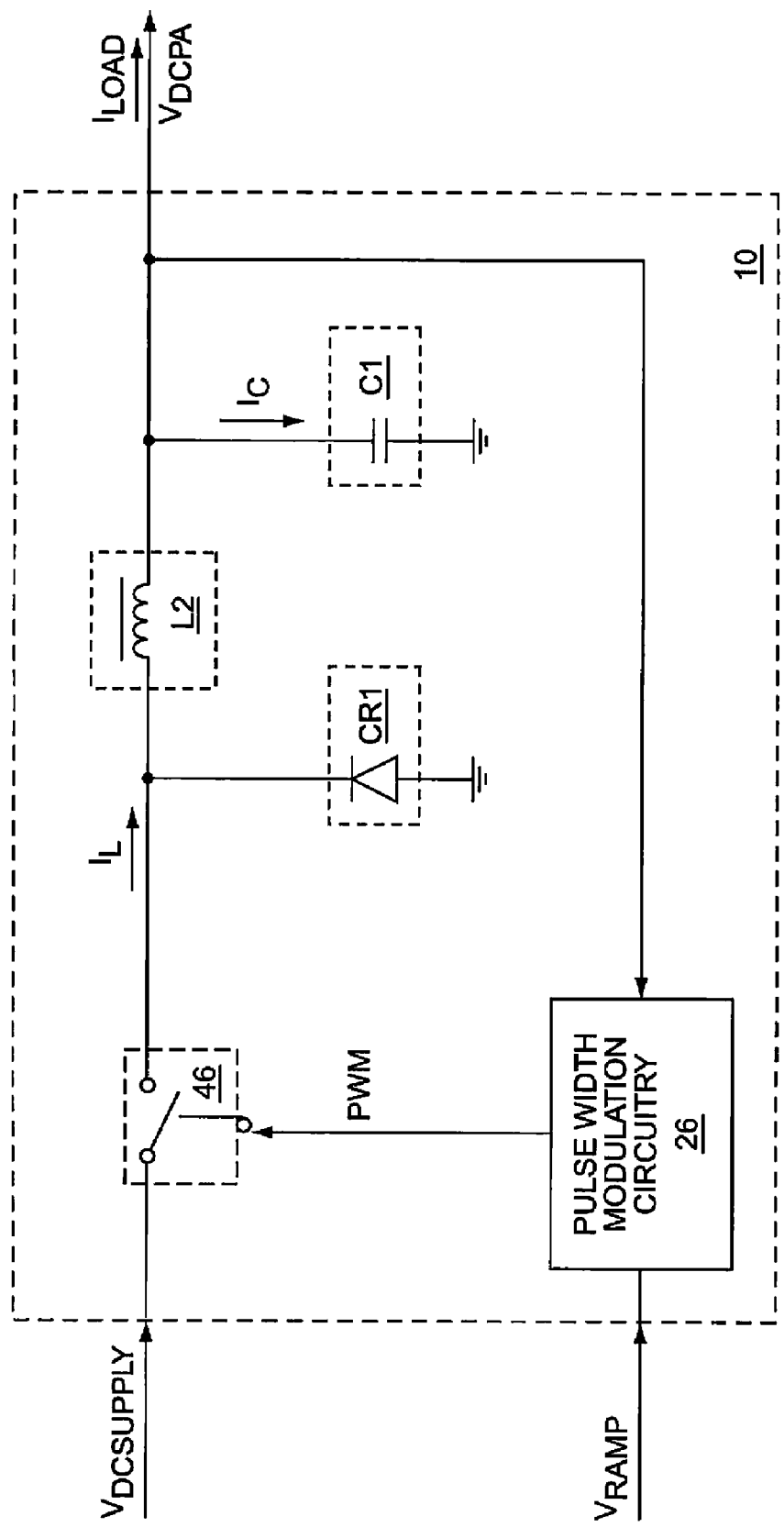
FIG. 7 shows details of the switching power supply illustrated in FIG. 5, according to an alternate embodiment of the present invention.
Figure 8:
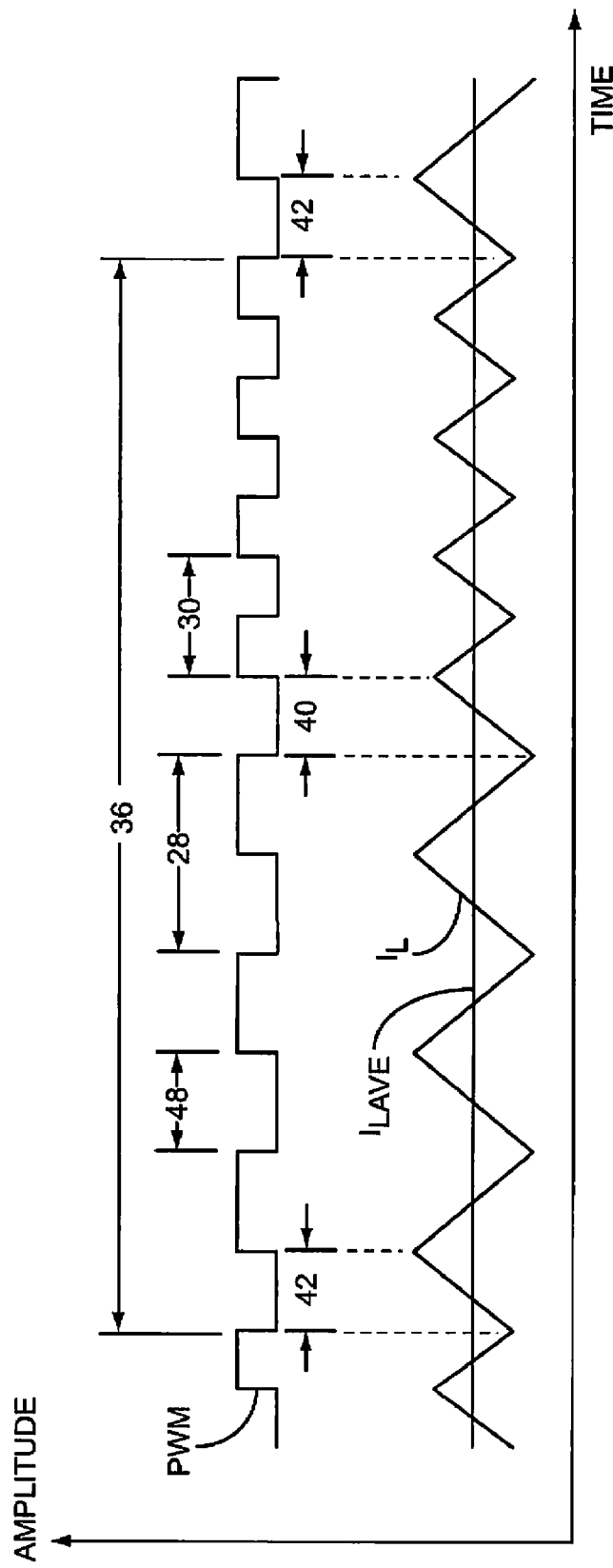
FIG. 8 is a graph showing the relationships between the PWM signal, the inductor current, and the average inductor current illustrated in FIG. 7, according to the present invention.

FIG. 7 shows details of the switching power supply 10 illustrated in FIG. 5, according to an alternate embodiment of the present invention. The switching element 24 is replaced with an active low switching element 46. When the PWM signal PWM is a "0," then the active low switching element 46 is closed, which causes the inductor current $I_L$ to increase. FIG. 8 is a graph showing the relationships between the PWM signal PWM and the inductor current $I_L$ illustrated in FIG. 7. When the PWM signal PWM is a "0," the PWM signal PWM provides active low pulses 48.

Figure 9:
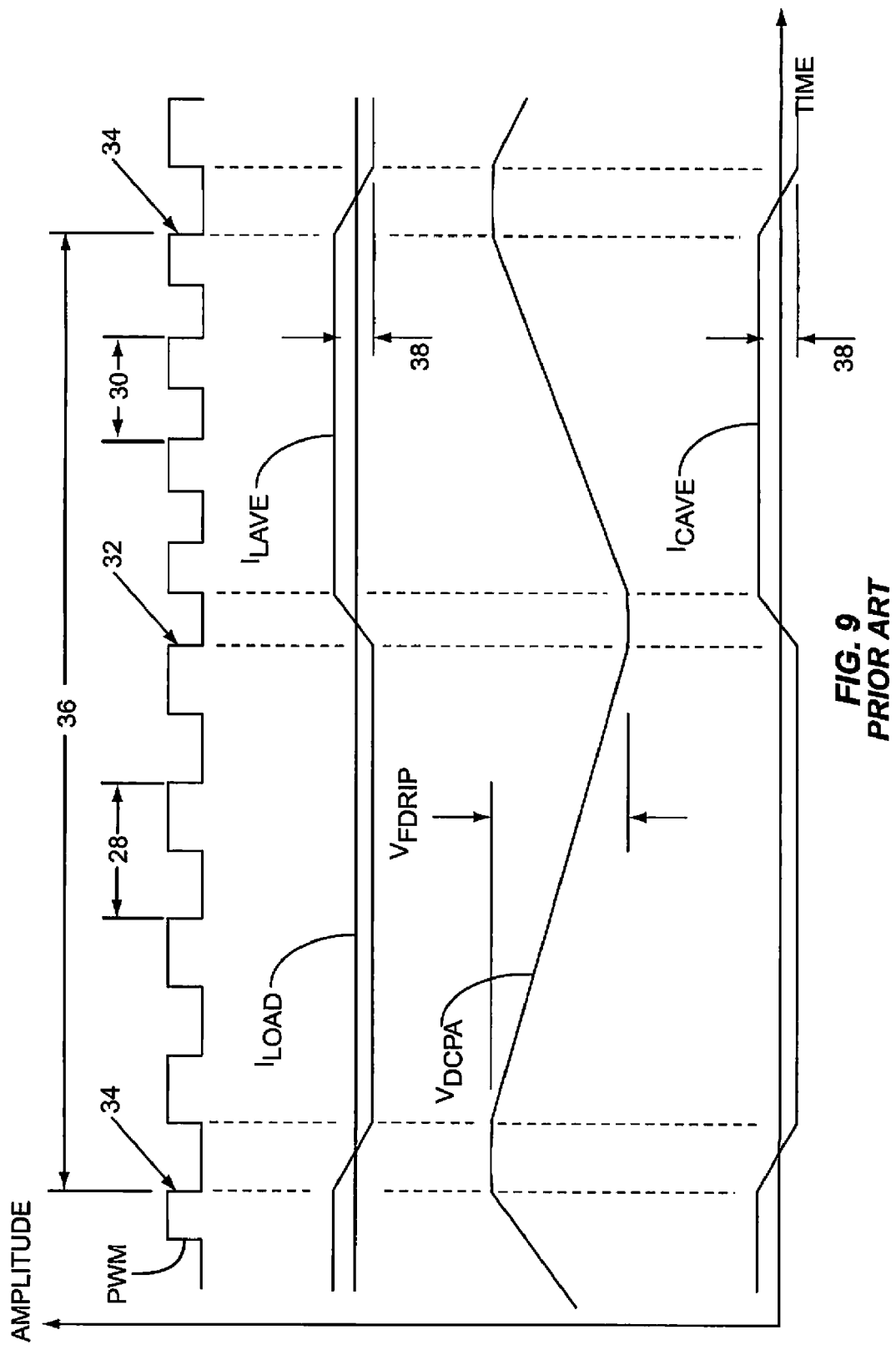
FIG. 9 is a graph showing the relationships between the PWM signal, the inductor current, the average inductor current, the DC PA signal, and the capacitor current illustrated in FIG. 5, according to the prior art.

FIG. 9 is a graph showing the relationships between the PWM signal PWM, the inductor current $I_L$, the average inductor current $I_{LAVE}$, the load current $I_{LOAD}$, the DC PA signal $V_{DCPA}$, and an average capacitor current $I_{CAVE}$, which is a cycle-by-cycle average of the capacitor current $I_C$ illustrated in FIG. 5, according to the prior art to show frequency dithering ripple voltage that is present without the present invention. If the load current $I_{LOAD}$ is approximately constant, then the dithering current ripple 38 is fed from the second inductive element L2 to the capacitive element C1. The dithering current ripple 38 causes a frequency dithering ripple voltage $V_{FDRIP}$ to appear across the capacitive element C1 as part of the DC PA signal $V_{DCPA}$. The frequency dithering ripple voltage $V_{FDRIP}$ may be coupled into the PA and appear at the PA's RF output and may violate output spectrum requirements. Therefore, by eliminating the dithering current ripple 38 and the resulting frequency dithering ripple voltage $V_{FDRIP}$, overall noise levels may be reduced, which may ease compliance with system requirements.

Figure 10:
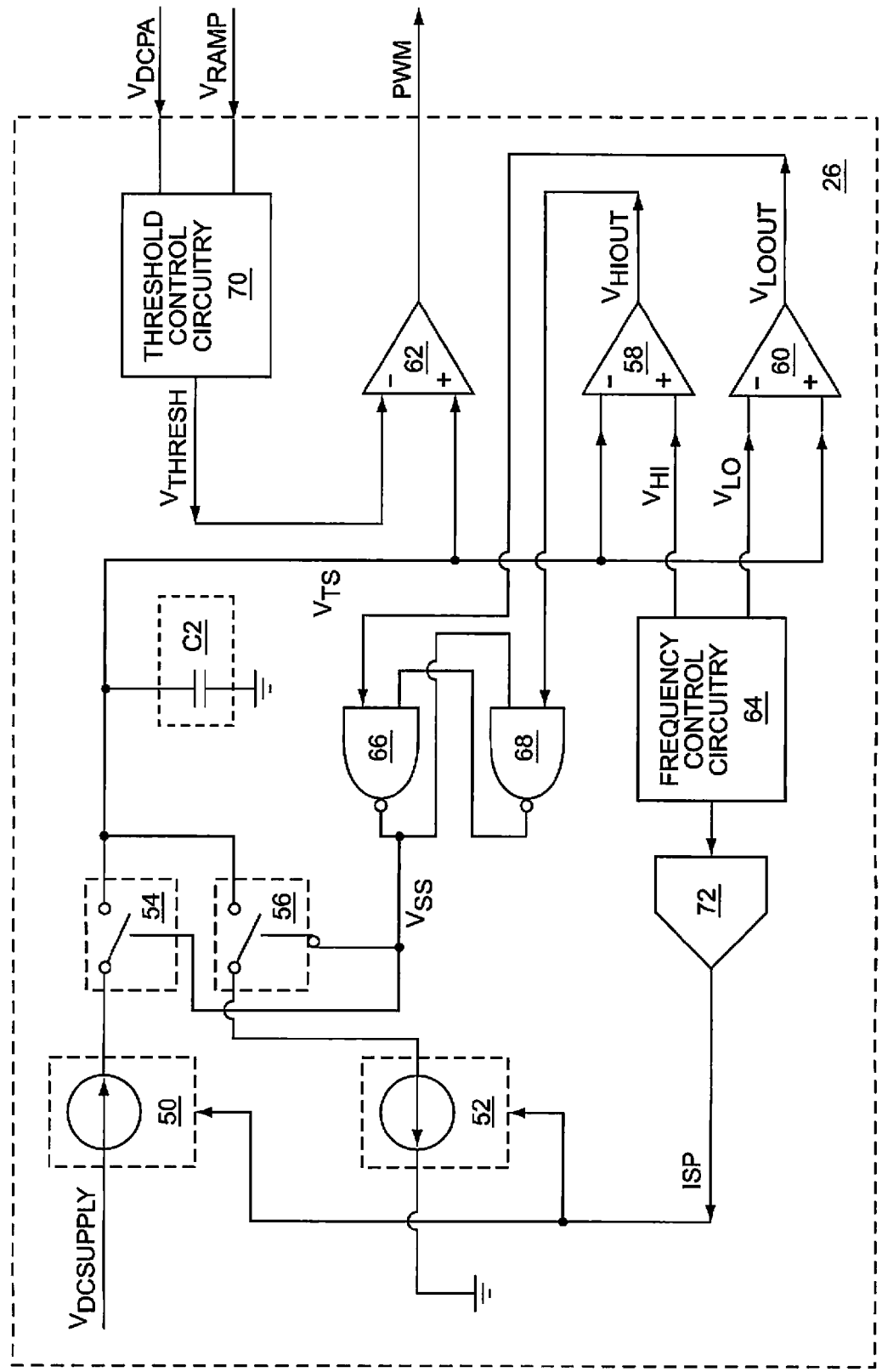
FIG. 10 shows details of the PWM circuitry illustrated in FIG. 5.

FIG. 10 shows details of the PWM circuitry 26 illustrated in FIG. 5. A timing signal $V_{TS}$ is generating by coupling either an up current source 50 or a down current source 52 to a timing capacitive element C2 through either a timing switching element 54 or an active low timing switching element 56, respectively. The timing signal $V_{TS}$ is a triangle wave, which appears across the timing capacitive element C2. When the timing switching element 54 is closed, the up current source 50 provides the positive slope of the timing signal $V_{TS}$, and when the active low timing switching element 56 is closed, the down current source 52 provides the negative slope of the timing signal $V_{TS}$. Alternate embodiments of the present invention may use timing signals $V_{TS}$ with different shapes, any number of current sources, any number of switching elements, or any combination thereof. The timing signal $V_{TS}$ feeds the inverting input of a high comparator 58, and the non-inverting inputs of a low comparator 60 and a PWM comparator 62. Frequency control circuitry 64 provides a low limit signal $V_{LO}$ to the inverting input of the low comparator 60, and a high limit signal $V_{HI}$ to the non-inverting input of the high comparator 58. The high and low limit signals $V_{HI}$, $V_{LO}$ determine the upper and lower limits of the timing signal $V_{TS}$. A first NAND gate 66 and a second NAND gate 68 are cross-coupled to form a set-reset flip-flop, which feeds the timing switching element 54 and the active low timing switching element 56. The high comparator 58 provides a high comparator output signal $V_{HIOUT}$ to one input of the flip-flop, and the low comparator 60 provides a low comparator output signal $V_{LOOUT}$ to the other input of the flip-flop.

In an alternate embodiment of the present invention, either the timing switching element 54 or the active low timing switching element 56, may be replaced with a short circuit if the setpoint of the opposite current source is doubled. For example, if the active low timing switching element 56 is replaced with a short circuit, and the setpoint of the up current source 50 is twice the setpoint of the down current source 52, then the positive slope of the timing signal $V_{TS}$ is determined by one-half the setpoint of the up current source 50, which is equal in magnitude (with a reversed sign) to the setpoint of the down current source 52 (since when the timing switching element 54 is closed one-half the current from the up current source 50 feeds the down current source 52, and one-half the current from the up current source 50 feeds the timing capacitive element C2, which causes the positive slope). The negative slope of the timing signal $V_{TS}$ is determined by the setpoint of the down current source 52 (since when the timing switching element 54 is open, the up current source 50 has no effect).

Threshold control circuitry 70 uses the DC PA signal $V_{DCPA}$ and the setpoint signal $V_{RAMP}$ to create a threshold signal $V_{THRESH}$, which feeds the inverting input of the PWM comparator 62. The PWM comparator 62 provides the PWM signal PWM and varies the pulse width of the PWM signal PWM based on the magnitude of the threshold signal $V_{THRESH}$. The frequency control circuitry 64 controls a DAC 72, which provides a current setpoint signal ISP to the up and down current sources 50, 52. The setpoint of the up and down current sources 50, 52 controls the slopes of the timing signal $V_{TS}$, which determines the frequency of the timing signal $V_{TS}$. Alternatively, the frequency of the timing signal $V_{TS}$ may be controlled by changing the low limit signal $V_{LO}$, the high limit signal $V_{HI}$, or both. Alternative embodiments of the present invention may use different methods for controlling the frequency of the timing signal $V_{TS}$. The flip-flop provides a switching signal $V_{SS}$ to the timing switching element 54 and the active low timing switching element 56. When the switching signal $V_{SS}$ is a "1," the timing switching element 54 is closed, and when the switching signal $V_{SS}$ is a "0," the active low timing switching element 56 is closed.

Figure 11:
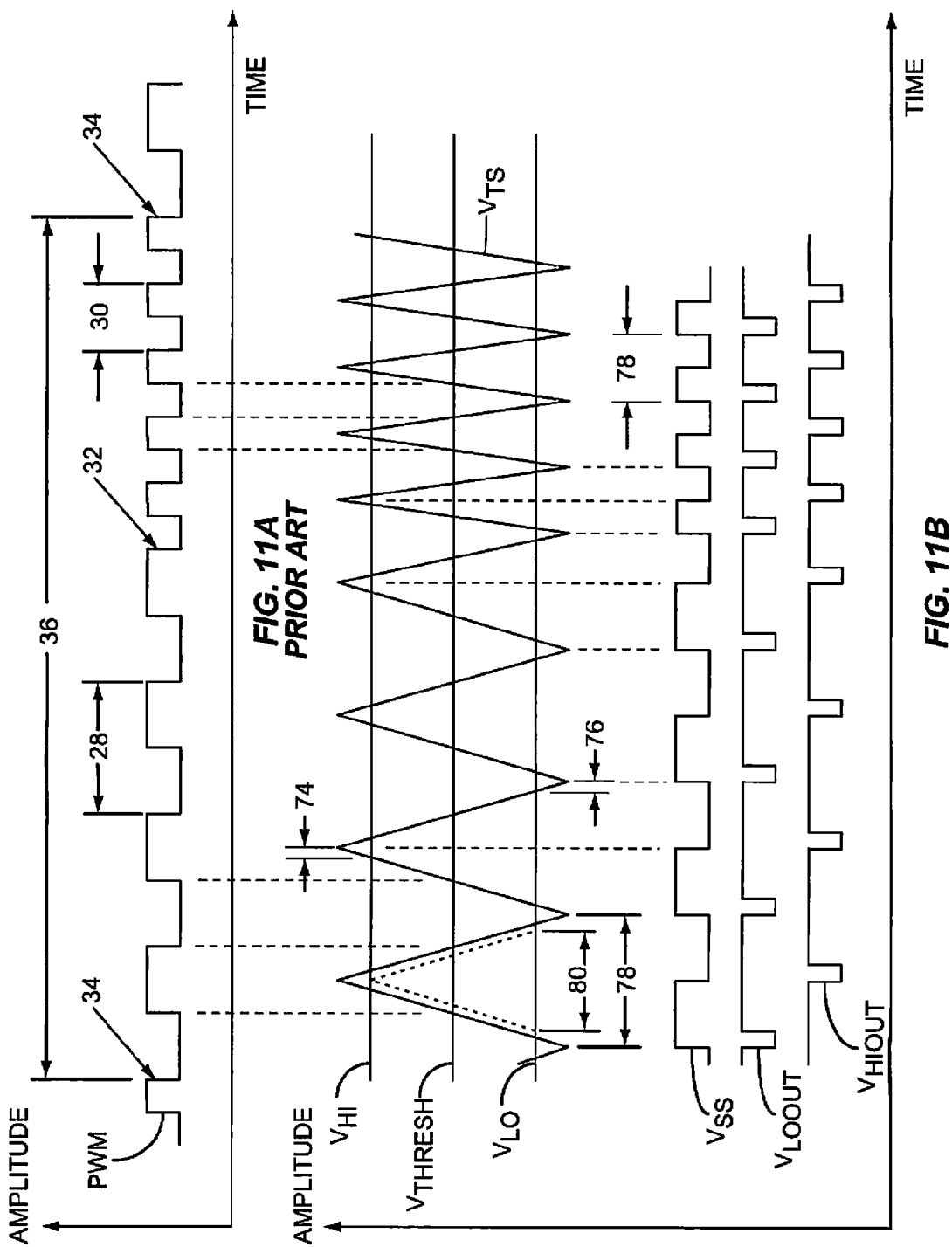
FIG. 11A is a graph showing the PWM signal, according to the prior art.
FIG. 11B is a graph showing the relationships between the PWM signal, the threshold signal, the low limit signal, the high limit signal, the switching signal, the low comparator output signal, and the high comparator output signal.

FIGS. 11A and 11B are graphs showing the relationships between the PWM signal PWM, the timing signal $V_{TS}$, the threshold signal $V_{THRESH}$, the low limit signal $V_{LO}$, the high limit signal $V_{HI}$, the switching signal $V_{SS}$, the low comparator output signal $V_{LOOUT}$, and the high comparator output signal $V_{HIOUT}$. When the timing signal $V_{TS}$ is ramping in a positive direction and reaches the same magnitude as the high limit signal $V_{HI}$, the high comparator output signal $V_{HIOUT}$ transitions low; however, an up propagation delay 74 through the high comparator 58, the flip-flop, and the switching elements 54, 56 may cause the timing signal $V_{TS}$ to overshoot its nominal value. Likewise, when the timing signal $V_{TS}$ is ramping in a downward direction and reaches a magnitude of the low limit signal $V_{LO}$, the low comparator output signal $V_{LOOUT}$ transitions low; however, a down propagation delay 76 from the low comparator 60, the flip-flop, and the switching elements 54, 56 may cause the timing signal $V_{TS}$ to overshoot the desired signal. As a result, a timing signal actual period 78 may be longer or shorter than a timing signal desired period 80. To compensate for the propagation delays, the low limit signal $V_{LO}$, the high limit signal $V_{HI}$, the current setpoint signal ISP, or any combination thereof, may be modified to achieve the timing signal desired period 80. Such modifications are made by the frequency control circuitry 64. As the switching frequency increases, the impacts of propagation delays 74, 76 becomes more significant.

Figure 12:
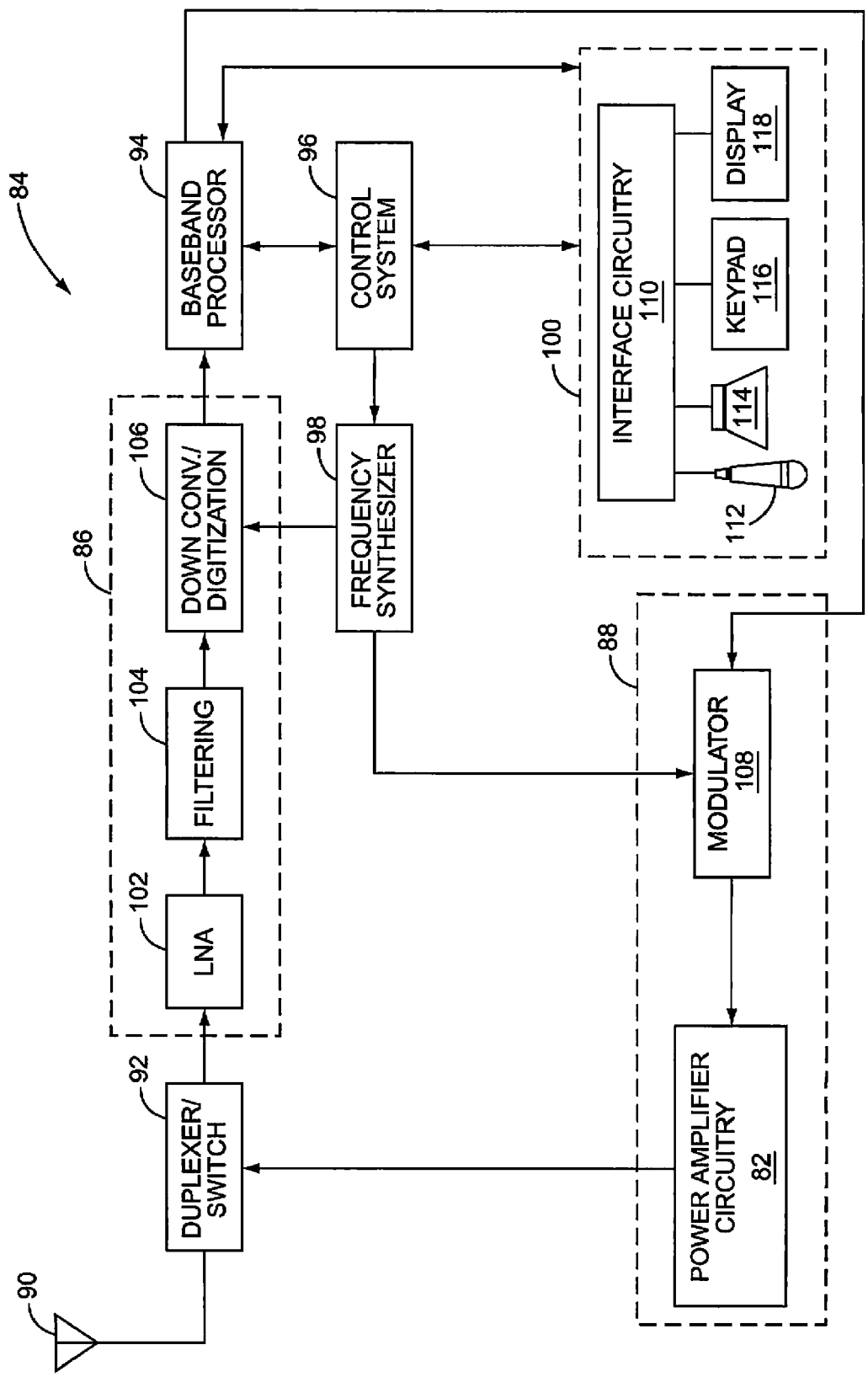
FIG. 12 shows an application example of the present invention used in a mobile terminal.

An application example of a switching power supply 10 feeding an RF PA 12 is its use in power amplifier circuitry 82 in a mobile terminal 84, the basic architecture of which is represented in FIG. 12. The mobile terminal 84 may include a receiver front end 86, a radio frequency transmitter section 88, an antenna 90, a duplexer or switch 92, a baseband processor 94, a control system 96, a frequency synthesizer 98, and an interface 100. The receiver front end 86 receives information bearing radio frequency signals from one or more remote transmitters provided by a base station (not shown). A low noise amplifier (LNA) 102 amplifies the signal. A filter circuit 104 minimizes broadband interference in the received signal, while down conversion and digitization circuitry 106 down converts the filtered, received signal to an intermediate or baseband frequency signal, which is then digitized into one or more digital streams. The receiver front end 86 typically uses one or more mixing frequencies generated by the frequency synthesizer 98. The baseband processor 94 processes the digitized received signal to extract the information or data bits conveyed in the received signal. This processing typically comprises demodulation, decoding, and error correction operations. As such, the baseband processor 94 is generally implemented in one or more digital signal processors (DSPs).

On the transmit side, the baseband processor 94 receives digitized data, which may represent voice, data, or control information, from the control system 96, which it encodes for transmission. The encoded data is output to the transmitter 88, where it is used by a modulator 108 to modulate a carrier signal that is at a desired transmit frequency. The power amplifier circuitry 82 amplifies the modulated carrier signal to a level appropriate for transmission, and delivers the amplified and modulated carrier signal to the antenna 90 through the duplexer or switch 92.

A user may interact with the mobile terminal 84 via the interface 100, which may include interface circuitry 110 associated with a microphone 112, a speaker 114, a keypad 116, and a display 118. The interface circuitry 110 typically includes analog-to-digital converters, digital-to-analog converters, amplifiers, and the like. Additionally, it may include a voice encoder/decoder, in which case it may communicate directly with the baseband processor 94. The microphone 112 will typically convert audio input, such as the user's voice, into an electrical signal, which is then digitized and passed directly or indirectly to the baseband processor 94. Audio information encoded in the received signal is recovered by the baseband processor 94, and converted by the interface circuitry 110 into an analog signal suitable for driving the speaker 114. The keypad 116 and display 118 enable the user to interact with the mobile terminal 84, input numbers to be dialed, address book information, or the like, as well as monitor call progress information.

Those skilled in the art will recognize improvements and modifications to the preferred embodiments of the present invention. All such improvements and modifications are considered within the scope of the concepts disclosed herein and the claims that follow.

What is claimed is:

1. A circuit comprising:
    switching circuitry adapted to:
        receive a switching signal having a switching frequency;
        transfer energy from a power source to an energy transfer circuit based on the switching signal; and
        transfer energy from the energy transfer circuit to a load to create a load voltage, which has a first ripple voltage at the switching frequency and a second ripple voltage at a dithering frequency, based on the switching signal; and
    control circuitry adapted to:
        provide the switching signal to regulate the load voltage based on the power source and a setpoint; and
        frequency-dither the switching frequency between a first frequency and a second frequency at the dithering frequency such that the second ripple voltage is approximately zero;
    wherein the switching signal further comprises:
        a first transitional period immediately following a period at the first frequency, and immediately preceding a period at the second frequency; and
        a second transitional period immediately following a period at the second frequency, and immediately preceding a period at the first frequency wherein the first transitional period and the second transitional period compensate an inductor current such that an average inductor current remains substantially constant.

2. The circuit of claim 1 wherein the energy transfer circuit comprises an average energy transfer current, such that the average energy transfer current when the switching frequency is the first frequency is approximately equal to the average energy transfer current when the switching frequency is the second frequency.

3. The circuit of claim 1 wherein the switching signal further comprises:
    a first transitional period immediately following a period at the first frequency, and immediately preceding a period at the second frequency; and
    a second transitional period immediately following a period at the second frequency, and immediately preceding a period at the first frequency.

4. The circuit of claim 1 wherein the switching signal further comprises:
    an active supply state such that energy is allowed to be transferred from the power source to the energy transfer circuit, and the first and second transitional periods are coincident with the active supply state; and
    an inactive supply state such that energy not is allowed to be transferred from the power source to the energy transfer circuit.

5. The circuit of claim 1 wherein the switching signal further comprises:
    an active supply state such that energy is allowed to be transferred from the power source to the energy transfer circuit; and
    an inactive supply state such that energy not is allowed to be transferred from the power source to the energy transfer circuit, and the first and second transitional periods are coincident with the inactive supply state.

6. The circuit of claim 1 wherein the switching signal further comprises:
    an active load state such that energy is allowed to be transferred from the energy transfer circuit to the load, and the first and second transitional periods are coincident with the active load state; and
    an inactive load state such that energy not is allowed to be transferred from the energy transfer circuit to the load.

7. The circuit of claim 1 wherein the switching signal further comprises:
    an active load state such that energy is allowed to be transferred from the energy transfer circuit to the load; and
    an inactive load state such that energy not is allowed to be transferred from the energy transfer circuit to the load, and the first and second transitional periods are coincident with the inactive load state.

8. The circuit of claim 1 wherein the first transitional period is approximately equal to the second transitional period.

9. The circuit of claim 8 wherein the first transitional period is approximately equal to a sum times a difference divided by two, such that the sum is approximately equal to the period at the first frequency plus the period at the one of the at least one other frequency, and the difference is approximately equal to one minus a duty-cycle of the switching signal.

10. The circuit of claim 1 wherein the control circuitry further comprises a timing signal having the switching frequency, and a switching threshold, such that the switching signal is based on the timing signal and the switching threshold.

11. The circuit of claim 10 wherein the timing signal has an approximate sawtooth shape.

12. The circuit of claim 10 wherein the timing signal has an approximate triangle shape.

13. The circuit of claim 12 wherein the control circuitry further comprises a current source coupled to a capacitive element to form a node, such that the current source provides a timing current and the timing signal is provided by the node.

14. The circuit of claim 13 wherein the switching frequency is based on the timing current.

15. The circuit of claim 14 wherein the control circuitry further comprises a current source digital-to-analog converter (DAC) coupled to the current source, such that the timing current is based on the DAC.

16. The circuit of claim 12 wherein the control circuitry further comprises a first comparator and a second comparator, such that the timing signal is based on the first comparator and the second comparator.

17. The circuit of claim 16 wherein the first comparator and the second comparator have at least one propagation delay, such that the switching threshold is adjusted to compensate for the at least one propagation delay.

18. The circuit of claim 1 wherein the control circuitry is further adapted to frequency-dither the switching frequency between a plurality of frequencies at the dithering frequency such that the second ripple voltage is approximately zero.

19. The circuit of claim 18 wherein the frequency-dither the switching frequency between a plurality of frequencies is based on a pseudo-random frequency dithering method.

20. The circuit of claim 18 wherein the frequency-dither the switching frequency between a plurality of frequencies is based on a triangular-shaped dithering method.

21. The circuit of claim 1 wherein the control circuitry further comprises digital circuitry adapted to provide the switching signal and the frequency-dither the switching frequency.

22. The circuit of claim 1 wherein the energy transfer circuit comprises at least one inductive element.

23. The circuit of claim 1 wherein the load comprises a radio frequency (RF) power amplifier (PA).

24. A method comprising:
   transferring energy based on a switching signal from a power source to a load, which has a first ripple voltage at a switching frequency and a second ripple voltage at a dithering frequency; and
   regulating power at the load based on the transferring and a setpoint; and
   frequency-dithering the switching frequency of the switching signal between a first frequency and at least one other frequency at the dithering frequency, such that the second ripple voltage is approximately zero;
wherein the switching signal further comprises:
   a first transitional period immediately following a period at the first frequency, and immediately preceding a period at the second frequency; and
   a second transitional period immediately following a period at the second frequency, and immediately preceding a period at the first frequency wherein the first transitional period and the second transitional period compensate an inductor current such that an average inductor current remains substantially constant.

* * * * *